US010150312B2

(12) United States Patent
Noguchi

(10) Patent No.: US 10,150,312 B2
(45) Date of Patent: Dec. 11, 2018

(54) CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Takayoshi Noguchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/597,289

(22) Filed: May 17, 2017

(65) Prior Publication Data

US 2017/0334223 A1 Nov. 23, 2017

(30) Foreign Application Priority Data

May 23, 2016 (JP) ................................ 2016-102758

(51) Int. Cl.
*H04N 1/00* (2006.01)
*G03G 15/23* (2006.01)
*B41J 13/00* (2006.01)
*G03G 15/00* (2006.01)

(52) U.S. Cl.
CPC ........ *B41J 13/0009* (2013.01); *G03G 15/234* (2013.01); *G03G 15/655* (2013.01); *H04N 1/0035* (2013.01); *H04N 1/00575* (2013.01)

(58) Field of Classification Search
CPC ............... B41J 13/0009; H04N 1/0035; H04N 1/00575; H04N 1/00612; H04N 1/32464; G03G 15/234; G03G 15/50; G03G 15/5095; G03G 15/6508; G03G 15/655; G03G 15/6579
See application file for complete search history.

(56) References Cited

U.S. PATENT DOCUMENTS

| 5,040,784 | A | * | 8/1991 | Akashi | .................. | B65H 29/52 |
| | | | | | | 271/220 |
| 5,132,719 | A | * | 7/1992 | Kioka | .................. | G03G 15/234 |
| | | | | | | 355/24 |
| 6,628,417 | B1 | | 9/2003 | Naito et al. | | |
| 6,963,721 | B2 | * | 11/2005 | Asai | .................. | G03G 15/6508 |
| | | | | | | 399/391 |
| 7,142,317 | B2 | | 11/2006 | Naito et al. | | |

(Continued)

FOREIGN PATENT DOCUMENTS

JP 2007-245701 A 9/2007

*Primary Examiner* — Anh T. N. Vo
(74) *Attorney, Agent, or Firm* — Fitzpatrick, Cella, Harper & Scinto

(57) ABSTRACT

A control apparatus includes a grouping unit configured to divide a plurality of sheets, each associated with a plurality of pages included in a processing target job into groups, and a control unit to control feeding of a sheet from a feeding unit onto a conveyance path and refeeding of a sheet that has been conveyed on the conveyance path onto the conveyance path. The grouping unit sets a group size that is not less than a maximum sheet size used in the processing target job, and the grouping unit decides the group of the predetermined page as the first group. The grouping unit also decides the group of the predetermined page as a second group different from the first group, and the control unit controls feeding and refeeding for each group grouped in the grouping unit.

13 Claims, 10 Drawing Sheets

(56) References Cited

U.S. PATENT DOCUMENTS

| | | |
|---|---|---|
| 7,196,811 B2 | 3/2007 | Naito et al. |
| 7,263,328 B2 * | 8/2007 | Asai ........................ B42C 19/02 |
| | | 101/484 |
| 7,271,928 B2 | 9/2007 | Naito et al. |
| 7,625,077 B2 | 12/2009 | Shinada et al. |
| 7,976,018 B2 * | 7/2011 | Ueda ...................... B65H 31/02 |
| | | 271/176 |

* cited by examiner

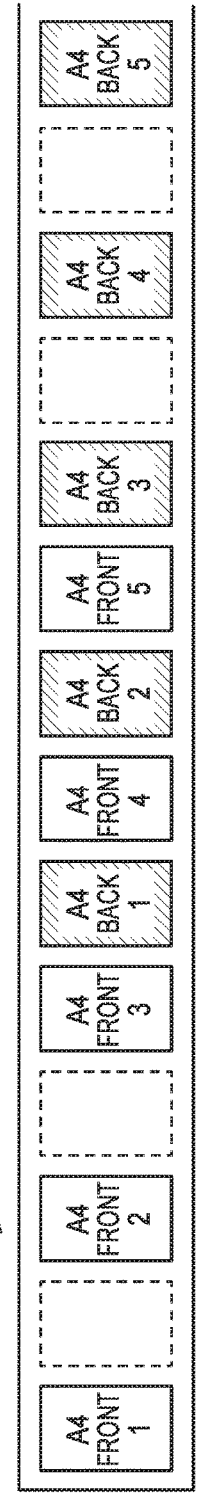
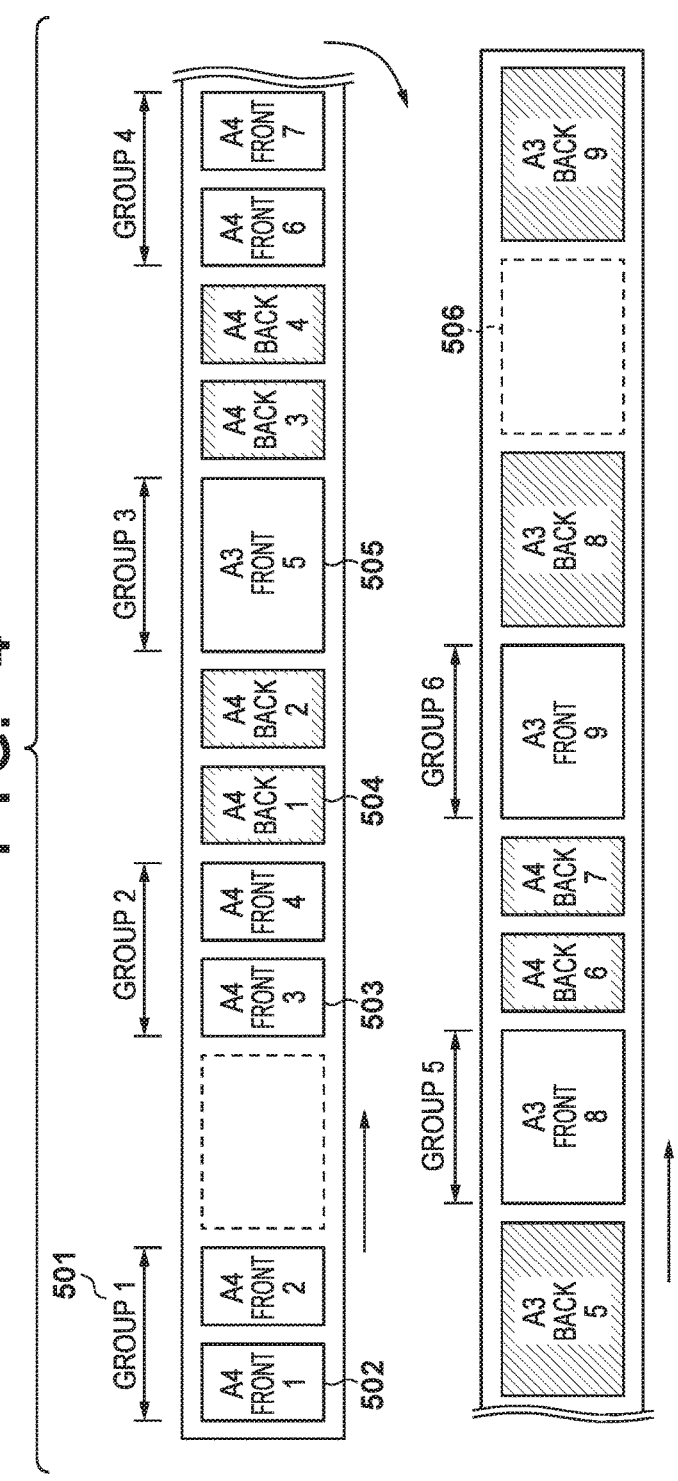

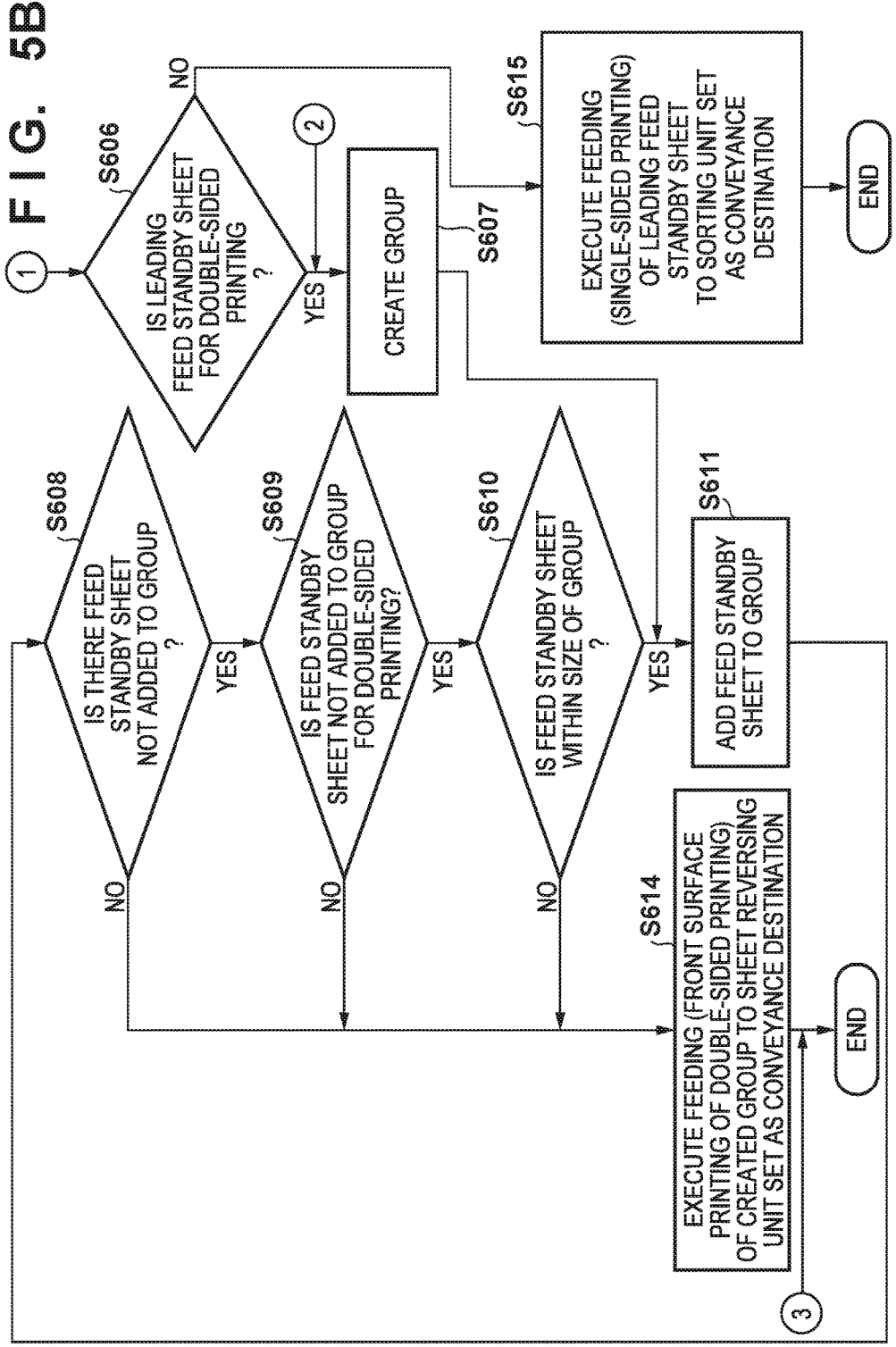

FIG. 7

| GROUP SIZE | CIRCULABLE GROUP COUNT |
|---|---|
| A3 LONG-SIDE | 3 |
| A4 SHORT-SIDE | 5 |
| L-SIZE SHORT-SIDE | 10 |

CONTROL APPARATUS, CONTROL METHOD, AND NON-TRANSITORY COMPUTER-READABLE STORAGE MEDIUM

BACKGROUND OF THE INVENTION

Field of the Invention

The present invention relates to a control apparatus, a control method, and a non-transitory computer-readable storage medium.

Description of the Related Art

In many cases, an image forming apparatus such as an inkjet printer or an electrophotographic printer has a function of accepting a plurality of print data (to be referred to as a print job or as a job, simply, hereafter), simultaneously, and printing successively. Some of these printing apparatuses are capable of double-sided printing, and there are a plurality of sheet reversing methods for double-sided printing in accordance with the types of the printing apparatuses and the printing speeds.

Also, in some cases, sheets of different sizes may be mixed in printing. Japanese Patent Laid-Open No. 2007-245701 discloses a control method related to an image forming apparatus that performs double-sided image formation by a cut-sheet circulation-type sheet conveyance method. More specifically, when it is determined that print sheets of different sizes will be used in the same job, a double-sided batch image formation mode is selected to control the double-sided image formation operation, and when print sheets of different sizes will not be used in the same job, a double-sided alternate image formation mode is selected.

In Japanese Patent Laid-Open No. 2007-245701, the printing efficiency is problematically reduced by the double-sided batch image formation mode. Hence, further improvement of printing efficiency is desired.

SUMMARY OF THE INVENTION

In consideration of the above problems, the present invention allows double-sided printing to be performed efficiently even when there is a mixture of sheets of different sizes.

According to one aspect, the present invention provides a control apparatus comprising a grouping unit configured to divide a plurality of sheets each associated with image data included in a processing target job into groups each having a predetermined size and a control unit configured to control feeding of a sheet from a feeding unit onto a conveyance path and refeeding of a sheet which has been conveyed on the conveyance path onto the conveyance path, wherein the predetermined size is not less than a maximum sheet size used in the processing target job, a plurality of groups can be conveyed on the conveyance path, and the control unit controls feeding and refeeding for each group grouped in the grouping unit.

According to another aspect, the present invention provides a control method comprising grouping to divide a plurality of sheets each associated with image data included in a processing target job into groups each having a predetermined size and controlling feeding of a sheet from a feeding unit onto a conveyance path and refeeding of a sheet which has been conveyed on the conveyance path onto the conveyance path, wherein the predetermined size is not less than a maximum sheet size used in the processing target job, a plurality of groups can be conveyed on the conveyance path, and the controlling controls feeding and refeeding for each group grouped in the grouping unit.

According to yet another aspect, the present invention provides a non-transitory computer-readable medium storing a program for causing a computer to function as a grouping unit configured to divide a plurality of sheets each associated with image data included in a processing target job into groups each having a predetermined size and a control unit configured to control feeding of a sheet from a feeding unit onto a conveyance path and refeeding of a sheet which has been conveyed on the conveyance path onto the conveyance path, wherein the predetermined size is not less than a maximum sheet size used in the processing target job, a plurality of groups can be conveyed on the conveyance path, and the control unit controls feeding and refeeding for each group grouped in the grouping unit.

According to the present invention, efficient double-sided printing is possible even when there is a mixture of sheets of different sizes.

Further features of the present invention will become apparent from the following description of exemplary embodiments (with reference to the attached drawings).

BRIEF DESCRIPTION OF THE DRAWINGS

FIG. 3 is a schematic view for explaining an example of a feed order of the image forming apparatus;

FIG. 4 is a schematic view showing the feed order when there is a mixture of sheets having two types of sizes according to the present invention;

FIGS. 5A and 5B are flowcharts showing feed scheduling processing according to the present invention;

FIG. 7 is a view showing an example of a table for deciding the number of groups that can be circulated according to the present invention;

DESCRIPTION OF THE EMBODIMENTS

Preferred embodiments of the present invention will be exemplarily described in detail below with reference to the accompanying drawings. Note that the relative arrangements, apparatus shapes, and the like, described in the embodiments are merely examples, and are not intended to limit the scope of the present invention. An "image forming apparatus" according to this specification is not limited to a dedicated device specialized in a print function, but also, includes a multifunctional peripheral which combines a print function and other functions, a manufacturing apparatus which forms an image or a pattern on a print sheet, and the like.

First Embodiment

Figure 1:
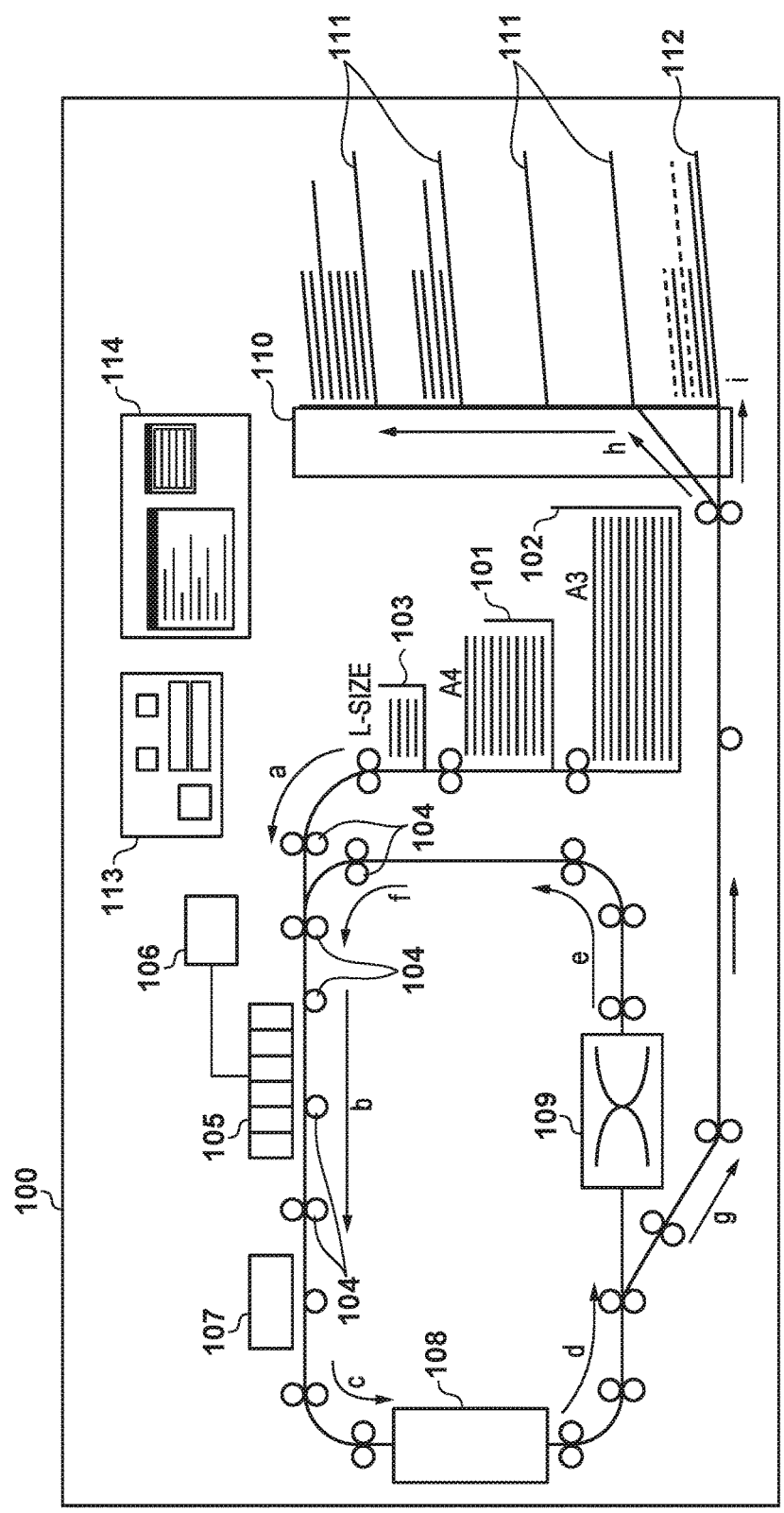
FIG. 1 is a sectional view showing the overall arrangement of an image forming apparatus according to the present invention.

FIG. 1 is a sectional view showing the overall arrangement of an image forming apparatus 100 according to the present invention. Here, an example of an image forming apparatus using sheets which have been cut and sorted into predetermined sizes such as cut sheets (L size, A4, and A3) will be described. The image forming apparatus 100 includes an A4 feeding tray 101, an A3 feeding tray 102, an L-size feeding tray 103, a sheet-conveyance rotating rollers 104, a printhead 105, and a scanner unit 107. Note that the size (the size of the corresponding sheet) of each feeding tray serving as a feeding unit is an example and is not limited to this. Also, the feeding trays are not limited to three stages and can include one to a plurality of stages in accordance with the apparatus arrangement. The plurality of feeding trays may be capable of storing the same kind of sheets or may store sheets which are different from each other. The image forming apparatus 100 also includes ink tanks 106, a drying unit 108, a sheet reversing unit 109, a sorting unit 110, and an operation unit 114.

A control unit 113 incorporates a control unit provided with a controller, a user interface, and various kinds of I/O interfaces and is in charge of various kinds of control of the entire image forming apparatus 100. The control unit 113 controls the conveying speed of the conveyance path by the sheet-conveyance rotating rollers 104. A sheet fed from the A4 feeding tray 101, A3 feeding tray 102, or the L-size feeding tray 103 is conveyed in the a direction of FIG. 1. The sheet-conveyance rotating rollers 104 cause the sheet to advance in the b direction of FIG. 1. Note that sheet-conveyance rotating rollers other than those shown by reference numeral 104 are arranged throughout the entire conveyance path of FIG. 1 and can convey a sheet to a predetermined location by motor control.

A sheet fed from one of the feeding trays passes a conveyance path and passes below the inkjet heads of the printhead 105. Independent inkjet heads having a plurality of colors (six colors in this case) are held along the sheet conveyance direction in the printhead 105. An image is formed on the sheet by discharging ink from each inkjet head of the printhead 105 in synchronization with the conveyance of the sheet. Each ink tank 106 stores one color of ink independently (not shown). Each ink tank 106 is connected by a tube to the corresponding color inkjet head of the printhead 105, and the ink is supplied.

The printhead 105 has line heads of the respective colors (six colors in this case) arrayed along in the b direction which is the conveyance direction in printing. The line head of each color can be formed from a single seamless nozzle chip. Alternatively, each line head can be formed by divided nozzle chips periodically arrayed in a line or in a staggered arrangement. In this embodiment, assume that the printhead 105 is a so-called "full multihead" in which nozzles are arrayed in a range covering the printing width of the maximum sheet to be used. An inkjet method of discharging ink from nozzles can adopt a method using heating elements, a method using piezoelectric elements, a method using electrostatic elements, a method using MEMS elements, or the like. Ink is discharged from the nozzles of each line head based on print data. Note that the present invention is not limited to an inkjet method printer and is also applicable to printers of a variety of printing methods such as a thermal printer (a sublimation type, a thermal transfer type, or the like), a dot impact printer, an LED printer, and a laser printer.

After an image is formed on a sheet, the sheet-conveyance rotating rollers 104 convey the sheet to the scanner unit 107. The scanner unit 107 checks whether there is a problem with the printed image by scanning the printed image or a special pattern and checks the state of the apparatus. The scanner unit 107 can also scan the state of the back surface which is the reverse surface of the print surface. For example, a predetermined pattern can be used to detect a shift in the printing positions of the front surface and that of the back surface.

The sheet which has passed the scanner unit 107 is conveyed further in the c direction and is passed through the drying unit 108. In the drying unit 108, in order to dry an ink-applied sheet in a short period, the sheet is heated with warm air while passing through the unit. The sheet which has passed through the drying unit 108 is conveyed further in the d direction to the sheet reversing unit 109. The sheet reversing unit 109 conveys the sheet so that the front and the back of the passing sheet will be reversed. As a method of reversing the sheet, there is a switchback method, a method of slightly twisting the conveyance path, or the like. In the switchback method, the movement of the sheet needs to be stopped temporarily. On the other hand, the method of twisting the conveyance path is suitable for printing at a higher speed since the sheet conveyance speed can be kept constant. Note that the reversing method is not limited to these. In this embodiment, the method which is capable of keeping the sheet conveyance speed at a constant speed is adopted as the reversing method. The sheet which has passed the sheet reversing unit 109 is conveyed further in the e direction and is in a front/back reversed state at this point. The sheet is conveyed further in the f direction and is returned again to the conveyance path on which the line heads of the printhead 105 are arrayed. That is, it becomes possible to form an image on the reverse surface (back surface) of a surface (front surface) on which an image has been formed by reversing the sheet in the sheet reversing unit 109.

In this manner, as the sheet conveyance path in the image forming apparatus 100, a path b-c-d-e-f-b in FIG. 1 is formed as a circulating path, and each sheet can be controlled so that the front surface and the back surface are changed upon making a round of this path. The number of sheets that can be present (can be conveyed) simultaneously on this circulating path is called "circulable sheet count". The circulable sheet count changes in accordance with the size of the sheet. For example, if the circulable sheet count of an A3 size sheet is three, it indicates that a maximum of three A3 size sheets can be conveyed simultaneously on the path b-c-d-e-f-b. On the other hand, a sheet that has completed printing does not pass the sheet reversing unit 109 but is changed from the d direction and conveyed further in the g direction after the drying unit 108 to the sorting unit 110. That is, the conveyance direction of a single-sided printing sheet is changed to the g direction in the middle (after the image formation has been completed for the front surface) of the first round, and the conveyance direction of a double-sided printing sheet is changed to the g direction in the middle (after image formation has been completed for both surfaces) of the second round. The sheet whose conveyance direction has been changed to the g direction and passed through the sorting unit 110 is confirmed by a sensor (not shown) and stacked on a tray with a corresponding number set for each printed image.

The sorting unit 110 is formed from a plurality of trays (here, five stages as an example), and the sheets are sorted on the stacking trays in accordance with the discharge method such as for each job or for each copy. The plurality of trays include one or a plurality of discharge trays 111 (four stages in this example) for discharging sheets that have been printed appropriately and one or a plurality of disposal trays 112 (one stage in this example) for disposing sheets used for maintenance or bad quality sheets. The sorting unit 110 conveys, to the discharge trays 111, a sheet whose conveyance direction has been changed to the h direction in FIG. 1 and conveys, to the disposal tray 112, a sheet whose conveyance direction has been changed to the i direction in FIG. 1.

The operation unit 114 is a unit for a user to confirm the printing status of each job such as the print product of the designated image is stacked on which tray, whether printing is ongoing, has ended or an error has occurred, and the like. The operation unit includes, for example, a display for displaying various kinds of information. The operation unit 114 is also an operation/confirmation unit for an operator to confirm an apparatus state such as the remaining ink amount or the remaining paper amount and perform apparatus maintenance such as head cleaning.

Figure 2:
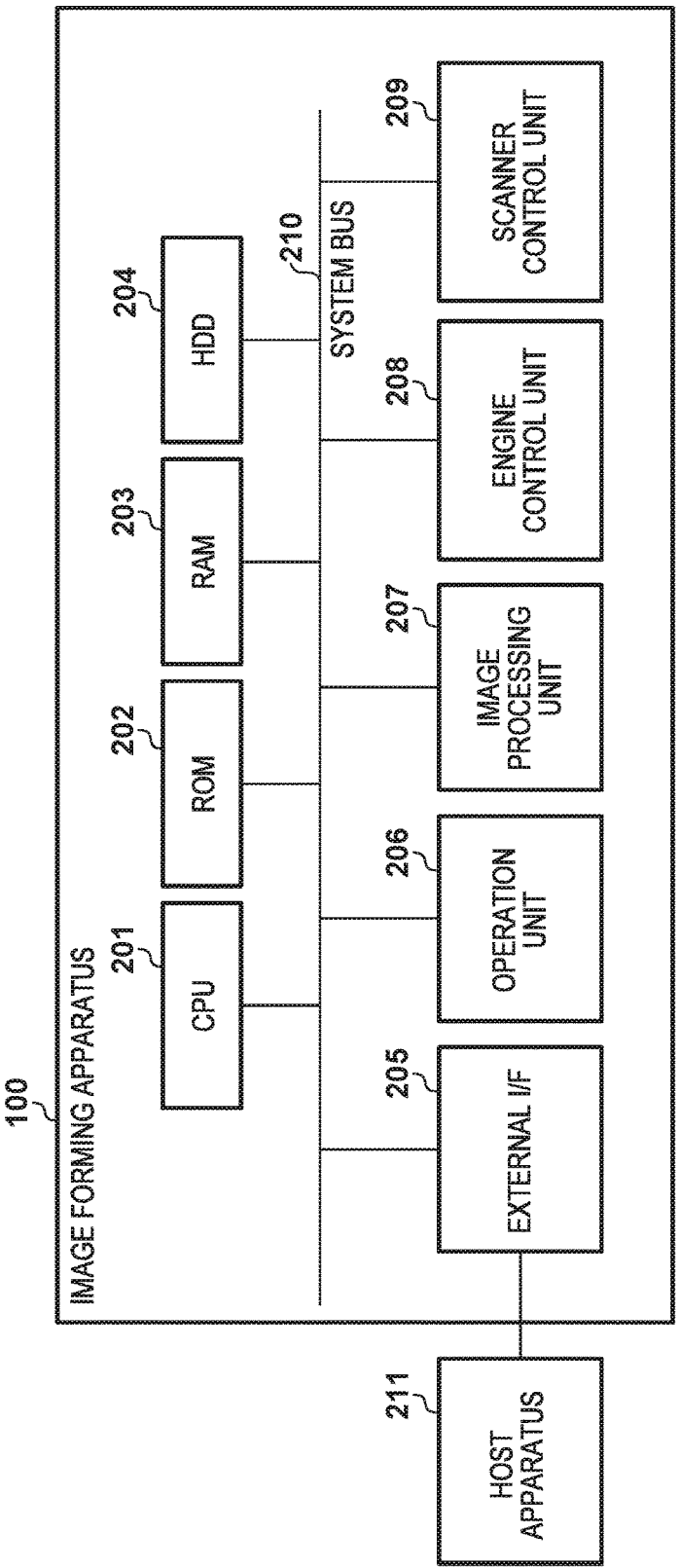
FIG. 2 is a block diagram for explaining the control arrangement of the image forming apparatus according to the present invention.

FIG. 2 is a block diagram showing an example of the control arrangement of the image forming apparatus 100 according to this embodiment. The image forming apparatus 100 includes a CPU 201, a ROM 202, a RAM 203, an HDD 204, an external I/F 205, an operation unit 206, an image processing unit 207, an engine control unit 208, and a scanner control unit 209. These components are communicably connected to each other via a system bus 210.

The CPU 201 controls the overall image forming apparatus 100. The ROM 202 is a nonvolatile storage area and stores control programs and permanent data. The RAM 203 is a volatile storage area and stores print job lists and work data received from a host apparatus 211. The HDD 204 temporarily stores image data received from the host apparatus 211. A print job transmitted from the host apparatus 211 is received by a control program on the ROM 202 via the external I/F 205. The information of the print job and the image data accompanying the print job are stored on the print job list on the RAM 203 and the HDD 204, respectively. Note that the print job may be obtained (received) from an external device or an external memory other than the host apparatus 211.

The operation unit 206 includes a display (not shown) for displaying the state of the apparatus and is used to input an operation instruction from the operator, to register various data, and to confirm the state of the apparatus. The image processing unit 207 performs image processing in the image forming apparatus 100. In an image processing operation, the color space (for example, YCbCr) of the image data is converted into a standard RGB color space (for example, sRGB). Also, various kinds of image processes such as resolution conversion to an effective pixel count, image analysis, and image correction are performed as needed. Print data obtained by these image processes is stored in the RAM 203 or the HDD 204.

The engine control unit 208 controls the printing of the print data on a printing medium such as a sheet in accordance with a received control command. The engine control unit 208 gives ink discharge instruction to the printhead 105 of each color, sets the discharge timing to adjust the dot position on the print medium, and obtains the head driving state. The engine control unit 208 controls the driving of the printhead 105 in accordance with the print data and causes the printhead 105 to discharge inks on the print medium to form an image. In addition, the engine control unit controls the conveyance rollers by instructing the driving of the feed rollers, instructing the driving of the conveyance rollers, and obtaining the rotation status of the conveyance rollers, and stops the conveyance of the print medium at a suitable speed.

The scanner control unit 209 controls an image sensor such as a CCD or a CIS in accordance with the received control command, reads the image on the print medium, and obtains analog luminance data of each red (R), green (G), and blue (B). The scanner control unit 209 instructs the driving of the image sensor, obtains the status of the image sensor, analyzes the luminance data obtained from the image sensor, and detects non-discharge of ink and the cutting position of the print medium.

The host apparatus 211 is a device that is connected outside the image forming apparatus 100 and serves as a source that provides various kinds of data. The host apparatus 211 may be a computer that creates and processes the data of an image related to printing or may be a reader unit for image reading. Print jobs, image data, other commands, status signals, and the like provided from the host apparatus 211 can be exchanged with the image forming apparatus 100 via the external I/F 205.

The control method of the respective components constituting the image forming apparatus may have an arrangement in which control is performed by dividing the processing units and the control units into a plurality of units each holding a CPU and is not limited to the above-described method.

A feeding method according to this embodiment will be described with reference to FIGS. 3, 4, 9, and 10. After a cut sheet has been fed to print the front surface, the sheet is refed to print the back surface. Note that each sheet that has completed double-sided printing is discharged sequentially. Feeding by setting the front surface of a cut sheet as the upper surface (printing surface) will be called a "front surface feed" or "feeding the front surface" and feeding by setting the back surface of the cut sheet as the upper surface (printing surface) will be called a "back surface feed" or "feeding the back surface", hereinafter. Note that since the back surface feed indicates feeding a sheet onto the same circulating path again after the sheet has been conveyed once around the circulating path, it is also called "refeed", hereinafter. Note that when the back surface feed is performed, an image based on image data has been already formed on the front surface by the printhead 105. However, in the case of a job in which no image is formed on the front surface, the sheet is refed without image formation.

In FIGS. 3, 4, 9, and 10, a solid frame line rectangle with a white interior indicates the front surface feed for double-sided printing or a feed for single-sided printing. Also, a solid frame line rectangle with a hatched interior indicates a back surface refeed for double-sided printing. Furthermore, a frame line formed from broken lines indicates an interval between sheets. Additionally, in each rectangle, the sheet size, whether it is the front surface or the back surface of the sheet, and the ordinal number of the sheet are indicated on the first, second, and third lines, respectively. Arrows indicate the feeding order of the sheets.

FIG. 3 is a view for explaining alternate circulation printing. Alternate circulation printing indicates printing in which feeding from the feeding trays (the A4 feeding tray 101, the A3 feeding tray 102, and the L-size feeding tray 103) and back surface feeding determined by the sheet reversing unit 109 are alternately performed. A case in which five same size sheets (A4) are fed will be described with reference to FIG. 3. For example, after the front surface of the first sheet is fed, an interval corresponding to the width (the width of an A4 sheet in this case) of the back surface of the refeed sheet is set and then the front surface of the second sheet is fed. After an interval corresponding to the width of the back surface of the refeed sheet is set, the third A4 sheet is fed. After the front surface of the third sheet is fed, the first sheet is reversed by the sheet reversing unit 109, and the back surface of the first sheet is refed. Subsequently, in the same manner, the front surface of the fourth sheet, the back surface of the second sheet, the front surface of the fifth sheet, and the back surface of the third sheet are fed. After the feeding of the back surface of the third sheet, since the front surface feed has been finished, an interval corresponding to the width of an A4 sheet is set, and the back surface of the fourth sheet is refed. Subsequently, an interval corresponding to the width of the A4 sheet is set, and the back surface of the fifth sheet is refed. The interval between the sheets is specified in accordance with the sheet size supported by the printing apparatus. Also, the distance (the length between the solid line frames) between the sheets conveyed as shown in FIG. 3 may be adjusted in accordance with the function of the printing apparatus.

Figure 9:
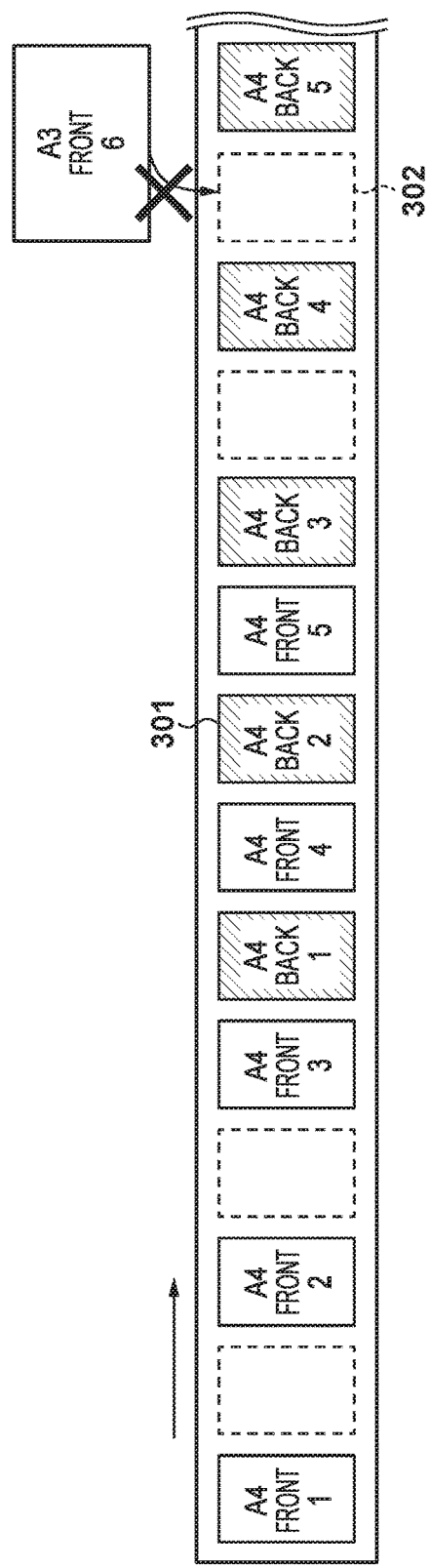
FIG. 9 is a view for explaining a state in which there is a mixture of sheets of different sizes.
Figure 10:
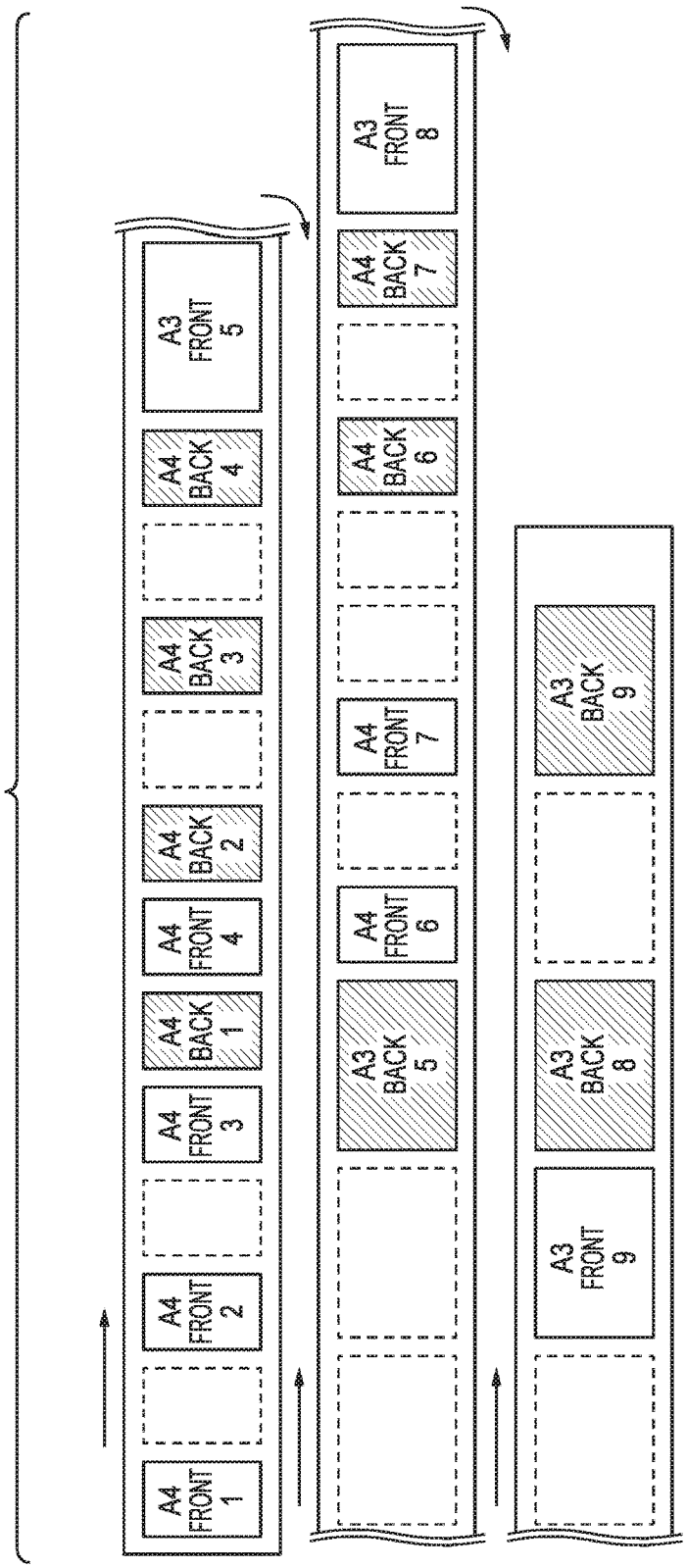
FIG. 10 is a schematic view showing a feeding order when there is a mixture of sheets of different sizes according to a related art.

Cases in which sheets having different sheet sizes are continuously printed will be described in FIGS. 4, 9, and 10. FIGS. 4, 9, and 10 each show a schematic view when double-sided printing is performed in the order of four A4 size sheets, one A3 size sheet, two A4 size sheets, and two A3 size sheets. The circulable sheet count is five sheets for A4 size sheets and three sheets for A3 size sheets.

FIG. 10 is a view for explaining a conventional method in which the front surface printing of the sheets of the next size is started after the back surface printing of each size has been performed every time the sheet size is changed. In this method, printing is performed while the conveyance speed of the sheet is kept constant. However, since the next front surface printing is performed after the back surface printing has been performed for each size every time the sheet size is changed, an interval between sheets is created every time the sheet size is changed. Hence, it takes more time to output the final printed sheet.

Here, the necessity of leaving an interval between the sheets each time the sheet size is changed will be described with reference to FIG. 9. As shown in FIG. 9, an interval between front surface sheets (interval between sheets) corresponds to the printing width of the back surface, that is, the width of the front surface sheet, thus it is the short-side width of A4 size sheet. In the same manner, an interval between back surface sheets (interval between sheets) corresponds to the short-side width of A4 size sheet. Therefore, if the conveyance speed is constant, even if an A3 size sheet is to be fed as the sixth sheet for printing, the sixth cut sheet cannot be put in. Note that if an A3 size sheet is to be fed at a timing 302, after the front surface printing of the fifth sheet is finished, it becomes necessary to temporarily stop (change the conveyance speed of) the sheet by a switchback mechanism or the like and leave an interval between that and the fourth sheet. That is, the sheet conveyance speed needs to be changed.

On the other hand, as shown in FIG. 4, according to the present invention, groups having predetermined group sizes are created (grouped), and whether to start feeding by a front surface printing feed or a back surface printing refeed is decided for each group. That is, the front surface feed and the back surface feed are performed alternately for each group. FIG. 4 is a schematic view showing the feed order when there is a mixture of sheets of different sizes in the present invention. This allows sheets to be fed efficiently even when there is a mixture of sheets of different sizes. In FIG. 4, the group size is set as the maximum sheet size to be used in that job. Here, a job is, for example, the whole print data having one or more pages. If A4 and A3 are the respective sheet sizes to be used in the job, the group size is set to be A3 long-side which is the maximum sheet size of the job, as shown in 501. However, the method of deciding the group size to be used is not limited to the above-described method. For example, the maximum sheet size out of a plurality of jobs that have been input can be used as the group size. In this embodiment, the group size is set to be equal to or more than the maximum sheet size (for example, A3 or larger) to be used in the processing target job and is of a size (for example, the width of A3) which can include a plurality of sheets of a predetermined sheet (for example, A4) to be used in the processing target job. The user may set and decide the group size via the operation unit 206. The maximum size among the sheet sizes that can be fed by the image forming apparatus 100 may also be set as the group size. Alternatively, the group size may be preset based on the length of the circulating path. More specifically, candidates each having an easily divisible size (for example, a size that can be divided into any of the corresponding sheet sizes) can be decided from the length of the circulating path, and a candidate closest to the sheet size of the input job can be automatically selected among the candidates. In addition, the maximum sheet size among the sheets held in the plurality of feeding trays may be set as the group size.

Rapid and efficient printing is possible by executing a plurality of jobs successively rather than printing for each job. If a plurality of jobs are to be executed successively, sheets corresponding to the plurality of jobs may be present simultaneously on the circulating path. Hence, the plurality of jobs are set to have the same group size. As a result, the number of intervals between sheets can be reduced while successively printing sheets belonging to different jobs. Sheets belonging to different jobs can also be fed as if they belong to the same group. In FIG. 4, in a case in which the first to fifth sheets belong to the first job and the sixth to ninth sheets belong to the second job, A3 long-side is set as the group size for either one of the jobs. For example, when a job processing interval is a predetermined length or more, the group size may be switched for each job.

Figure 5A:
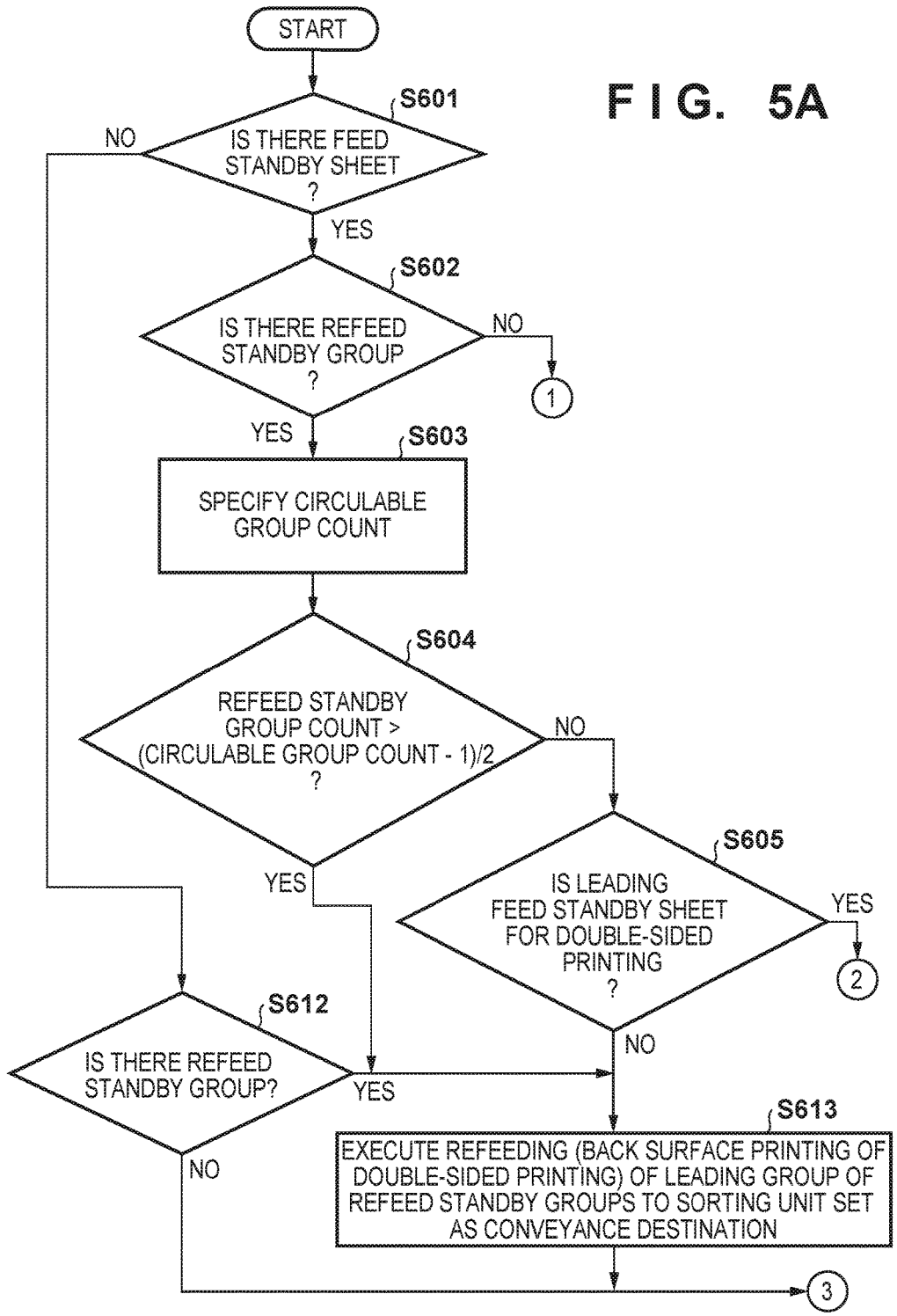

FIGS. 5A and 5B are flowcharts showing feed scheduling processing according to this embodiment. In this embodiment, the processing procedure is implemented when the CPU 201, shown in FIG. 2, loads to the ROM 202 a program stored in the RAM 203 and executes the program. The feeding control method according to this embodiment will be described below by raising examples of detailed timings with reference to FIGS. 4, 5A, and 5B.

First, the processing procedure executed at or before a timing 502 of FIG. 4 will be described. In FIG. 4, arrows indicate the order in which a sheet is fed to the conveyance path, and FIG. 4 is a schematic view showing the result of the feed to the conveyance path decided by the flowcharts of FIGS. 5A and 5B. A description of deciding whether to feed a feed standby sheet onto the conveyance path will be given hereinafter.

In step S601, the CPU 201 determines whether there is a feed standby sheet. If it is before the printing of the first sheet, the first sheet is present as a feed standby sheet (YES in step S601), and the process advances to step S602. In step S602, the CPU 201 determines whether there is a group on standby for refeeding. Here, refeeding means feeding a sheet which has been conveyed on the conveyance path once so that the sheet can be conveyed again on the conveyance path for double-sided printing or the like. Note that in the case of refeeding, not a sheet from the feeding tray but a sheet which is on the conveyance path is conveyed again. That is, a refeed standby group means, among the sheets conveyed on the conveyance path, a group of sheets that have not completed printing of their back surfaces. If it is before the printing of the first sheet, there is no refeed standby group (NO in step S602), and the process advances to step S606.

Figure 6:
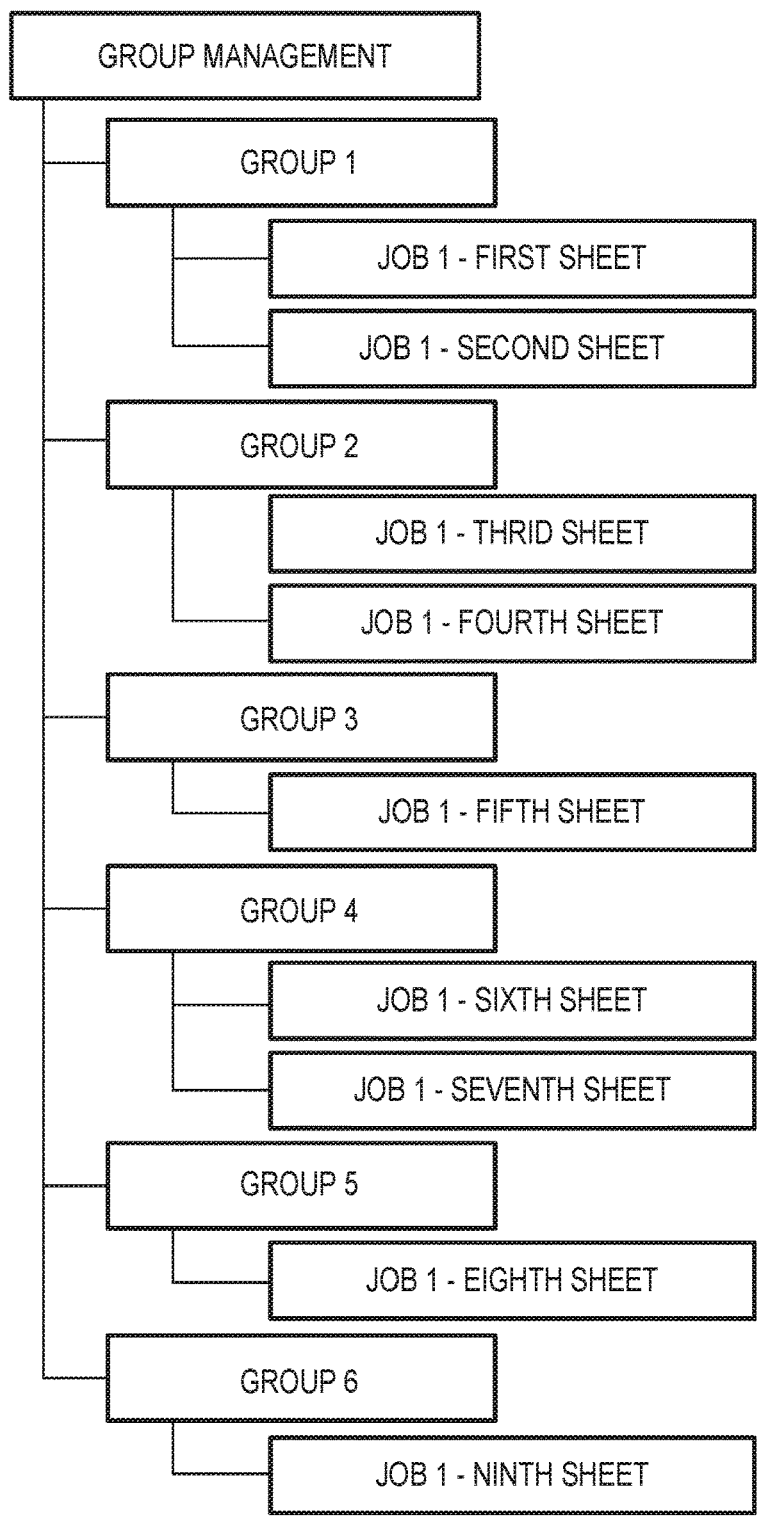
FIG. 6 is a view showing an example of the configuration of group information according to the present invention.

In step S606, the CPU 201 determines whether double-sided printing is to be performed on the first feed standby sheet. More specifically, print settings set on the image data associated with the first feed standby sheet are obtained to determine whether the target sheet is for double-sided printing. Since the first sheet is for double-sided printing (YES in step S606), the process advances to step S607. In step S607, the CPU 201 creates a group, and the process advances to step S611. The group created here will be described below as "group 1". Assume that the size of group 1 created here is A3 long-side which is the predetermined size as described above. Note that in this embodiment the size is determined as A3 long-side based on the print settings included in a job when the job is input. An example of the information configuration of the created group is shown in FIG. 6. Which sheet of which job belongs to each of the created groups is managed as the group information. Note that, as the group information, new information is added to the group information each time a group is created, and the group information corresponding to a group that has completed printing is deleted as needed. Here, an example in which one entire job (job 1) has been divided into groups is shown. However, assume that the group information will be managed in a similar manner even when there are a plurality of jobs. The group information shown in FIG. 6 is held in the RAM 203 and the HDD 204.

In step S611, the CPU 201 adds the first sheet which is a feed standby sheet to group 1 created in step S607, and the process advances to step S608. In step S608, the CPU 201 determines whether there is a feed standby sheet that has not been added to the group. Here, since there is a second sheet, it is determined that a feed standby sheet is present (YES in step S608), and the process advances to step S609. In step S609, the CPU 201 determines whether the standby sheet that has not been added to the group is for double-sided printing. Since the second sheet is for double-sided printing (YES in step S609), the process advances to step S610.

In step S610, the CPU 201 determines whether the second sheet can be added to the group of interest (group 1). The determination of this addition is determined based on whether a size obtained by adding the lengths of the sheet already added to the group (the first sheet) and the sheet to be added next (the second sheet) in the conveyance direction is larger than the group size. At this point, the first sheet is included in group 1. Also, since the group size of group 1 is set to A3 long-side, it is 420 mm. Accordingly, each of the first and second sheets has a size equal to A4 short-side and is 210 mm. Hence, since the first sheet+the second sheet is 210 mm+210 mm, the two sheets are within 420 mm which is the length of A3 long-side. Therefore, YES is determined in step S610, and the process advances to step S611.

In step S611, the CPU 201 adds the second sheet to group 1 which was created in step S607, and the process advances to step S608. In step S608, the CPU 201 determines whether there is a feed standby sheet that has not been added to group 1. Here, since there is a third sheet, it is determined that a feed standby sheet is present (YES in step S608), and the process advances to step S609. In step S609, the CPU 201 determines whether the feed standby sheet that has not been added to group 1 is for double-sided printing. Since the third sheet is for double-sided printing (YES in step S609), the process advances to step S610.

In step S610, the CPU 201 determines whether the third sheet can be added to group 1. At this point, the first and second sheets have been included in group 1. Additionally, the group size of group 1 is A3 long-side and the size of each of the first, second, and third sheets is A4 short-side. Hence, since the addition of the third sheet will exceed the size of group 1, the third sheet cannot be added to group 1. Therefore, NO is determined in step S610, and the process advances to step S614. In step S614, the CPU 201 feeds all of the sheets in group 1 to the sheet reversing unit 109 set as the conveyance destination. That is, the CPU 201 feeds the first and second sheets from the feeding tray so as to execute the front surface printing of the double-sided printing on the first and second sheets. Subsequently, the main processing procedure ends.

In this manner, the above-described processing is performed at each feeding of a group.

The processing procedure which is executed at a timing 503 or before the timing 503 of FIG. 4 will be described next.

In step S601, the CPU 201 determines whether there is a feed standby sheet. Since there is a third feed standby sheet before the timing 503 (YES in step S601), the process advances to step S602. In step S602, the CPU 201 determines whether there is a feed standby group. Here, a feed standby group indicates a group that has been fed but has not been refed yet. In this case, since group 1 is present as a refeed standby group for the back surface printing of the double-sided printing (YES in step S602), and the process advances to step S603.

In step S603, the CPU 201 specifies a circulable group count. The circulable group count is decided by the group size (and the length of the circulating path) and may be specified from a correspondence table between the group size and the circulable group count or calculated from the group size and the length of the circulating path. In addition, the circulable group count is the same as the circulable sheet count when the group size is set to have the same size as that of the sheet size. In this embodiment, the circulable group count is specified from the correspondence table between the group size and the circulable group count shown in FIG. 7. Assume that the correspondence table of FIG. 7 is held in the RAM 203 or the HDD 204. In this embodiment, as the group size of group 1 is A3 long-side, the circulable group count is "3". The CPU 201 obtains this value, and the process advances to step S604.

In step S604, the CPU 201 determines whether a refeed standby group count is more than "(circulable group count−1)/2". Here, in this embodiment, since the feed determination is performed for each group, the value of "(circulable group count−1)/2" is used so that an interval between the sheets will be the shortest. More specifically, since the circulable group count obtained in step S603 is "3", the value becomes (3−1)/2=1. Hence, the CPU 201 compares "1" with the refeed standby group count. Since there is only group 1 in the timing 503, the refeed standby group count is 1. Therefore, since the refeed group count is not more than 1 (NO in step S604), the process advances to step S605.

In step S605, the CPU 201 determines whether the leading feed standby sheet is for double-sided printing. Since the third sheet is for double-sided printing (YES in step S605), the process advances to step S607. In step S607, the CPU

201 creates a new group, and the process advances to step S611. The created group will be described as "group 2" hereinafter. In step S611, the CPU 201 adds the third sheet to group 2 which was created in step S607, and the process advances to step S608.

In step S608, the CPU 201 determines whether there is a feed standby sheet that has not been added to group 2. Here, since there is a fourth sheet, it is determined that a feed standby sheet is present (YES in step S608), and the process advances to step S609. In step S609, the CPU 201 determines whether the feed standby sheet that has not been added to group 2 is for double-sided printing. Since the fourth sheet is for double-sided printing (YES in step S609), the process advances to step S610. In step S610, the CPU 201 determines whether the fourth sheet can be added to group 2. At this point, the third sheet is included in group 2. The group size of group 2 is A3 long-side. The size of the each of the third and fourth sheets is A4 short-side. Hence, the third and fourth sheets are within the length of A3 long-side which is the group size of group 2. Therefore, YES is determined in step S610, and the process advances to step S611. In step S611, the CPU 201 adds the fourth sheet to group 2 which was created in step S607, and the process advances to step S608.

In step S608, the CPU 201 determines whether there is another feed standby sheet that has not been added to group 2. Here, since there is a fifth sheet (YES in step S608), the process advances to step S609. In step S609, the CPU 201 determines whether the feed standby sheet that has not been added to the group is for double-sided printing. Since the fifth sheet is for double-sided printing (YES in step S609), the process advances to step S610. In step S610, the CPU 201 determines whether the fifth sheet can be added to group 2. At this point, the third and fourth sheets are included in group 2. The group size of group 2 is A3 long-side, and the size of each of the third and fourth sheets is A4 short-side. The size of the fifth sheet is A3 long-side. Hence, the fifth sheet cannot be added to group 2 since the addition of the fifth sheet will exceed the group size of group 2. Therefore, NO is determined in step S610, and the process advances to step S614. In step S614, the CPU 201 feeds all of the sheets in group 2 to the sheet reversing unit 109 set as the conveyance destination. That is, the CPU 201 feeds the third and fourth sheets from the feeding tray so as to execute the front surface printing of double-sided printing on the third and fourth sheets. Subsequently, the main processing procedure ends.

Note that although it is shown in the procedure, when a sheet is fed onto the circulating path and reaches the printhead 105, the sheet is printed with an image based on image data associated with the sheet.

The processing procedure which is executed before a timing 504 of FIG. 4 will be described.

In step S601, the CPU 201 determines whether there is a feed standby sheet. In this case, since there is a fifth feed standby sheet (YES in step S601), the process advances to step S602. In step S602, the CPU 201 determines whether there is a refeed standby group. In this case, since there are refeed standby groups 1 and 2 (YES in step S602), the process advances to step S603. In step S603, the CPU 201 checks the circulable group count. Here, the CPU refers to the correspondence table of FIG. 7 in the manner described above, and it is determined that the circulable group count is 3. The CPU 201 obtains this value, and the process advances to step S604.

In step S604, the CPU 201 determines whether the refeed standby group count is more than "(circulable group count−1)/2". Here, the value of "(circulable group count−1)/2" is 1, and the CPU 201 compares "1" with the refeed standby group count. In the timing 504, since there are groups 1 and 2, the refeed standby group count is 2. Hence, the refeed standby group count is more than 1 (YES in step S604), and the process advances to step S613.

In step S613, the CPU 201 refeeds all of the sheets of group 1, which is the leading group of the refeed standby groups, to the sorting unit 110 set as the conveyance destination. That is, the CPU 201 refeeds the sheets so as to execute the back surface printing of the double-sided printing on the first and second sheets. Subsequently, the main processing procedure ends.

The processing procedure executed at a timing 505 or before the timing 505 will be described next with reference to FIG. 4.

In step S601, the CPU 201 determines whether there is a feed standby sheet. In this case, since there is a fifth feed standby sheet (YES in step S601), the process advances to step S602. In step S602, the CPU 201 determines whether there is a refeed standby group. In this case, since group 2 is present as a refeed standby group (YES in step S602), the process advances to step S603. In step S603, the CPU 201 checks the circulable group count. The CPU refers to the correspondence table of FIG. 7 in the manner described above, and it is determined that the circulable group count is 3. The CPU 201 obtains the value, and the process advances to step S604.

In step S604, the CPU 201 determines whether the refeed standby group count is more than "(circulable group count−1)/2". Here, the value of "(circulable group count−1)/2" is 1, and the CPU 201 compares "1" with the refeed standby group count. The refeed standby group count is 1 since there is only group 2 in the timing 505. Hence, the refeed standby group count is not more than 1 (NO in step S604), and the process advances to step S605.

In step S605, the CPU 201 determines whether the leading feed standby sheet is for double-sided printing. Since the fifth sheet is for double-sided printing (YES in step S605), the process advances to step S607. In step S607, the CPU 201 creates a new group, and the process advances to step S611. The created group will be described as "group 3" hereinafter. In step S611, the CPU 201 adds the fifth sheet to group 3 which was created in step S607, and the process advances to step S608.

In step S608, the CPU 201 determines whether there is a feed standby sheet that has not been added to group 3. Here, since there is a sixth sheet (YES in step S608), the process advances to step S609. In step S609, the CPU 201 determines whether the sheet that has not been added to the group is for double-sided printing. Since the sixth sheet is for double-sided printing (YES in step S609), the process advances to step S610.

In step S610, the CPU 201 determines whether the sixth sheet can be added to group 3. At this point, the fifth sheet is included in group 3. The group size of group 3 is A3 long-side. The size of the fifth sheet is A3 long-side, and the size of the sixth sheet is A4 short-side. Hence, since the addition of the sixth sheet will exceed the size of group 3, the sixth sheet cannot be added to group 3. Therefore, NO is determined in step S610, and the process advances to step S614. In step S614, the CPU 201 feeds all of the sheets in group 3 to the sheet reversing unit 109 set as the conveyance destination. That is, the CPU 201 feeds the sheet from the feeding tray so as to execute the front surface printing of the double-sided printing on the fifth sheet. Subsequently, the main processing procedure ends.

The processing procedure executed at a timing 506 or before the timing 506 will be described next with reference to FIG. 4.

In step S601, the CPU 201 determines whether there is a feed standby sheet. In this case, since there is no feed standby sheet (NO in step S601), the process advances to step S612. In step S612, the CPU 201 determines whether there is a refeed standby group. In this case, since group 2 is present as a refeed standby group (YES in step S612), the process advances to step S613. In step S613, the CPU 201 refeeds all the sheets in group 6, which is the leading group of the refeed standby groups, to the sorting unit 110 set as the conveyance destination. That is, the CPU 201 refeeds the sheet so as to execute the back surface printing of the double-sided printing on the ninth sheet. Subsequently, the main processing procedure ends.

The processing procedures in cases other than the timings 502 to 506 of FIG. 4 will be described below.

In step S606, if it is determined that a sheet is for single-sided printing (NO in step S606), the CPU 201 feeds, in step S615, the leading feed standby sheet to the sorting unit 110 set as the as the conveyance destination. That is, in the case of single-sided printing, each sheet is fed without creating a group for that sheet. Subsequently, the main processing procedure ends.

Also, in step S608, if it is determined that there is no feed standby sheet that has not been added to the group (NO in step S608), and the CPU 201 feeds, in step S614, all of the sheets in the group to the sheet reversing unit 109 set as the conveyance destination. Subsequently, the main processing procedure ends.

In step S609, if it is determined that the feed standby sheet which has not been added to the group is for single-sided printing (YES in step S609), the CPU 201 feeds, in step S614, all of the sheets in the group to the sheet reversing unit 109 set as the conveyance destination. Subsequently, the main processing procedure ends.

In step S605, if it is determined that the leading feed standby sheet is for single-sided printing (NO in step S605), the CPU 201 refeeds, in step S613, all of the sheets in the leading group of the refeed standby groups to the sorting unit 110 set as the conveyance destination. Subsequently, the main processing procedure ends.

In step S612, if it is determined that there is no refeed standby group (NO in step S612), the main processing procedure ends.

As described above, in this embodiment, sheets within a predetermined size are put together as a group (set of sheets), and whether to perform a front surface feed or a back surface feed is decided for each group based on the circulable group count and the number of groups present on the circulating path. That is, by repeating steps S607 to S611 a plurality of times, a plurality of sheets which are associated with image data are divided into a plurality of groups, and the feeding timing of each group is decided. As a result, even if there is a mixture of sheets of different sizes, the feeding timing can be controlled to efficiently perform double-sided printing while keeping the sheet conveyance speed constant.

Figure 8:
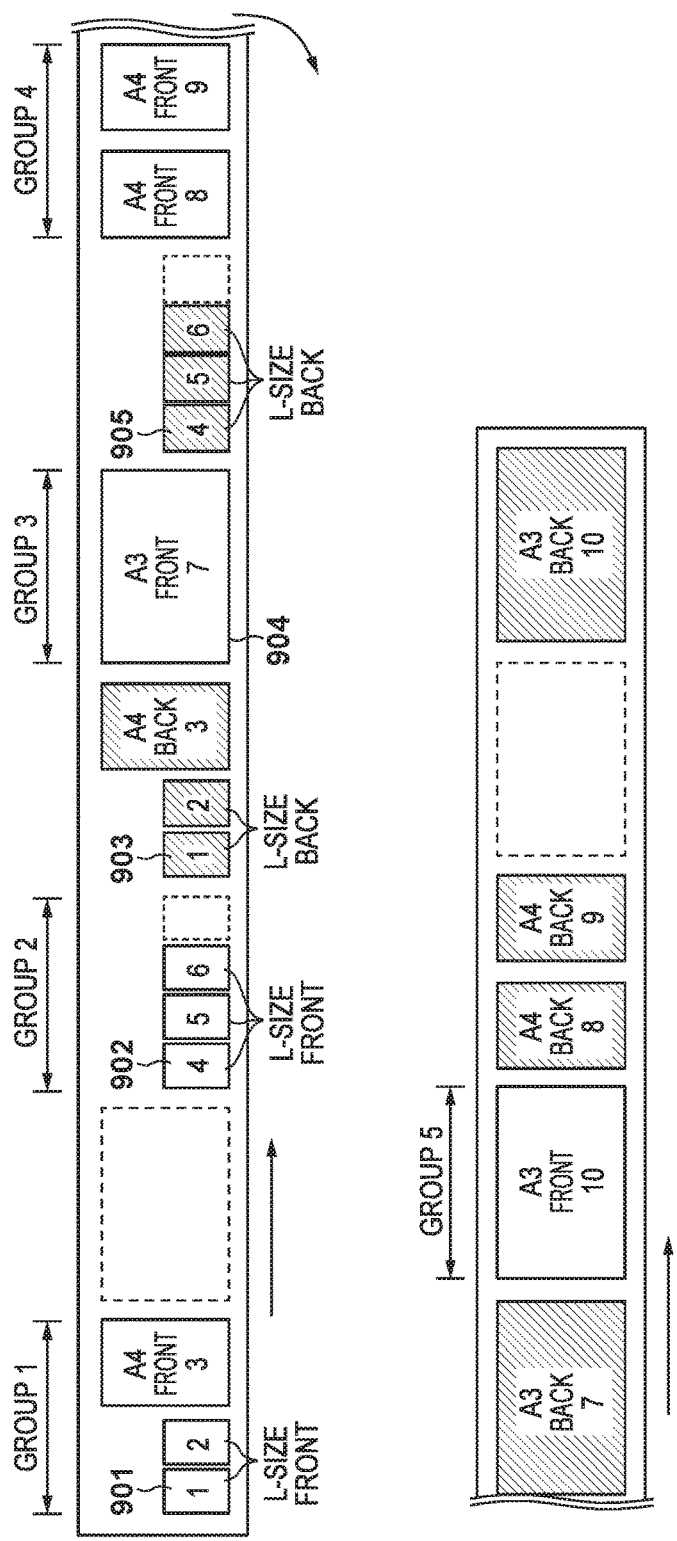
FIG. 8 is a schematic view showing the feeding order when there is a mixture of sheets of three types of sizes according to the present invention.

The feed scheduling when A3 and A4, which are sheets of two different sizes, are mixed has been shown. Next, the feed scheduling when sheets of three different sizes are mixed will be exemplified. FIG. 8 is a schematic view showing the feeding order when a there is a mixture of sheets of three different sizes. FIG. 8 shows a case in which double-sided printing is performed in the order of two L-size sheets, one A4 size sheet, three L-size sheets, one A3 size sheet, two A4 size sheets, and one A3 size sheet. Also, assume that the circulable group count, that is, the circulable sheet count is five for A4 size sheets and three for A3 size sheets as in the same manner as above. In addition, assume that the group size is A3 long-side.

The feeding control method according to this embodiment will be described below by raising examples of detailed timings with reference to FIGS. 5A, 5B, and 8.

First, the processing procedure executed at a timing 901 or before the timing 901 of FIG. 8 will be described.

In step S601, the CPU 201 determines whether there is a feed standby sheet. In this case, since there is a first feed standby sheet (YES in step S601), the process advances to step S602. In step S602, the CPU 201 determines whether there is refeed standby group. In this case, since there is no refeed standby group (NO in step S602), the process advances to step S606. In step S606, the CPU 201 determines whether the leading feed standby sheet is for double-sided printing. Since the first sheet is for double-sided printing (YES in step S606), the process advances to step S607. In step S607, the CPU 201 creates a new group, and the process advances to step S611. The created group will be described as "group 1" hereafter.

In step S611, the CPU 201 adds the first sheet to group 1 which was created in step S607, and the process advances to step S608. In step S608, the CPU 201 determines whether there is a feed standby sheet that has not been added to group 1. Here, since there is a second sheet, it is determined that a feed standby sheet is present (YES in step S608), and the process advances to step S609. In step S609, the CPU 201 determines whether the feed standby sheet that has not been added to group 1 is for double-sided printing. Since the second sheet is for double-sided printing (YES in step S609), the process advances to step S610.

In step S610, the CPU 201 determines whether the second sheet can be added to group 1. At this point, the first sheet is included in group 1. The group size of group 1 is A3 long-side, and the size of each of the first and second sheets is L-size short-side. Hence, even if the second sheet is added, it is within the group size of group 1. Therefore, YES is determined in step S610, and the process advances to step S611. In step S611, the CPU 201 adds the second sheet to group 1 created in step S607, and the process advances to step S608.

In step S608, the CPU 201 determines whether there is a feed standby sheet that has not been added to group 1. Here, since there is third sheet, it is determined that a feed standby sheet is present (YES in step S608), and the process advances to step S609. In step S609, the CPU 201 determines whether the feed standby sheet that has not been added to group 1 is for double-sided printing. Since the third sheet is for double-sided printing (YES in step S609), the process advances to step S610.

In step S610, the CPU 201 determines whether the third sheet can be added to group 1. At this point, the first and second sheets are included in group 1. The group size of group 1 is A3 long-side, the size of each of the first and second sheets is L-size short-side, and the third sheet is A4 short-side. Hence, even if the third sheet is added, it is within the group size of group 1. Therefore, YES is determined in step S610, and the process advances to step S611. In step S611, the CPU 201 adds the third sheet to group 1 created in step S607, and the process advances to step S608.

In step S608, the CPU 201 determines whether there is a feed standby sheet that has not been added to group 1. Here, since there is a fourth sheet, it is determined that a feed standby sheet is present (YES in step S608), and the process advances to step S609. In step S609, the CPU 201 determines whether the feed standby sheet that has not been added to group 1 is for double-sided printing. Since the fourth sheet is for double-sided printing (YES in step S609), the process advances to step S610.

In step S610, the CPU 201 determines whether the fourth sheet can be added to group 1. At this point, the first, second, and third sheets are included in group 1. The group size of group 1 is A3 long-side, the size of each of the first, second, and fourth sheets is L-size short-side, and the size of the third sheet is A4 short-side. Hence, since the addition of the fourth sheet will exceed the size of group 1, the fourth sheet cannot be added to group 1. Therefore, NO is determined in step S610, and the process advances to step S614. In step S614, the CPU 201 feeds all the sheets in group 1 to the sheet reversing unit 109 set as the conveyance destination. That is, the CPU 201 feeds the first, second, and third sheets from the feeding tray so as to execute the front surface printing of the double-sided printing on the first, second, and third sheets. Subsequently, the main processing procedure ends.

The processing procedure executed at a timing 902 or before the timing 902 of FIG. 8 will be described next.

In step S601, the CPU 201 determines whether there is a feed standby sheet. In this case, since there is the fourth feed standby sheet (YES in step S601), the process advances to step S602. In step S602, the CPU 201 determines whether there is a refeed standby group. In this case, since group 1 is present as a refeed standby group (YES in step S602), the process advances to step S603. In step S603, the CPU 201 checks the circulable group count. The CPU refers to the correspondence table of FIG. 7 as described above in the first embodiment. It is determined that the circulable group count is 3. The CPU 201 obtains the value, and the process advances to step S604.

In step S604, the CPU 201 determines whether the refeed standby group count is more than "(circulable group count−1)/2". Here, the value of "(circulable group count−1)/2" is 1, and the CPU 201 compares "1" with the refeed standby group count. The refeed standby group count is 1 since there is only group 1 in the timing 902. Hence, the refeed standby group count is not more than 1 (NO in step S604), and the process advances to step S605. In step S605, the CPU 201 determines whether the leading feed standby sheet is for double-sided printing. Since the fourth sheet is for double-sided printing (YES in step S605), the process advances to step S607.

In step S607, the CPU 201 creates a new group, and the process advances to step S611. The created group will be described as "group 2" hereinafter. In step S611, the CPU 201 adds the fourth sheet to group 2 created in step S607, and the process advances to step S608.

In step S608, the CPU 201 determines whether there is a feed standby sheet that has not been added to group 2. Here, since there is a fifth sheet, it is determined that a feed standby sheet is present (YES in step S608), and the process advances to step S609. In step S609, the CPU 201 determines whether the feed standby sheet that has not been added to group 2 is for double-sided printing. Since the fifth sheet is for double-sided printing (YES in step S609), the process advances to step S610.

In step S610, the CPU 201 determines whether the fifth sheet can be added to group 2. At this point, the fourth sheet is included in group 2. The group size of group 2 is A3 long-side, and the size of each of the fourth and fifth sheets is L-size short-side. Hence, even if the fifth sheet is added, it is within the group size of group 2. Therefore, YES is determined in step S610, and the process advances to step S611. In step S611, the CPU 201 adds the fifth sheet to group 2 created in step S607, and the process advances to step S608.

In steps S608 to S610, the CPU 201 performs the same determination as that of the fifth sheet to a sixth sheet. In step S611, the CPU 201 adds the sixth sheet to group 2 created in step S607, and the process advances to step S608. Additionally, in steps S608 and S609, the CPU 201 performs the same determination as that of the sixth sheet for a seventh sheet, and the process advances to step S610.

In step S610, the CPU 201 determines whether the seventh sheet can be added to group 2. At this point, the fourth, fifth, and sixth sheets are included in group 2. The group size of group 2 is A3 long-side, the size of each of the fourth, fifth, and sixth sheets is L-size short-side, and the size of the seventh sheet is A3 long-side. Hence, since the addition of the seventh sheet to group 2 will exceed the size of group 2, the seventh sheet cannot be added to group 2. Therefore, NO is determined in step S610, and the process advances to step S614.

In step S614, the CPU 201 feeds all of the sheets in group 2 to the sheet reversing unit 109 set as the conveyance destination. That is, the CPU 201 executes the front side printing of the double-sided printing on the fourth, fifth, and sixth sheets. Subsequently, the main processing procedure ends.

The processing procedure executed at a timing 903 or before the timing 903 of FIG. 8 will be described next.

In step S601, the CPU 201 determines whether there is a feed standby sheet. In this case, since there is the seventh feed standby sheet (YES in step S601), the process advances to step S602. In step S602, the CPU 201 determines whether there is a refeed standby group. In this case, since the refeed standby groups 1 and 2 are present (YES in step S602), the process advances to step S603. In step S603, the CPU 201 checks the circulable group count. The CPU 201 refers to the correspondence table of FIG. 7 as described above, and it is determined that the circulable group count is 3. The CPU 201 obtains the value, and the process advances to step S604.

In step S604, the CPU 201 determines whether the refeed standby group count is more than "(circulable group count−1)/2". Here, the value of "(circulable group count−1)/2" is 1, and the CPU 201 compares "1" with the refeed standby group count. In the timing 903, since there are groups 1 and 2, the refeed standby group count is 2. Hence, the refeed standby group count is more than 1 (YES in step S604), and the process advances to step S613. In step S613, the CPU 201 refeeds all of the sheets in group 1, which is the leading group of the refeed standby groups, to the sorting unit 110 set as the conveyance destination. That is, the CPU 201 executes the back surface printing of double-sided printing on the first, second, and third sheets. Subsequently, the main processing procedure ends.

The main processing procedure at a timing 904 or before the timing 904 of FIG. 8 will be described next.

In step S601, the CPU 201 determines whether there is a feed standby sheet. In this case, since there is the seventh feed standby sheet (YES in step S601), the process advances to step S602. In step S602, the CPU 201 determines whether there is a refeed standby group. In this case, since group 2 is present as a refeed standby group for double-sided printing (YES in step S602), the process advances to step S603. In step S603, the CPU 201 checks the circulable group count. The CPU refers to the correspondence table of FIG. 7 as described above, and it is determined that the circulable group count is 3. The CPU 201 obtains the value, and the process advances to step S604.

In step S604, the CPU 201 determines whether the refeed standby group count is more than "(circulable group count−1)/2". Here, the value of "(circulable group count−1)/2" is 1, and the CPU 201 compares "1" with the refeed standby group count. In the timing 904, since there is only group 2, the refeed standby group count is 1. Hence, the refeed standby group count is not more than 1 (NO in step S604), and the process advances to step S605. In step S605, the CPU 201 determines whether the leading feed standby sheet is for double-sided printing. Since the third sheet is for double-sided printing (YES in step S605), the process advances to step S607.

In step S607, the CPU 201 creates a new group, and the process advances to step S611. The created group will be described as "group 3" hereinafter. In step S611, the CPU 201 adds the seventh sheet to group 3 created in step S607, and the process advances to step S608.

In step S608, the CPU 201 determines whether there is a feed standby sheet that has not been added to group 3. Here, since there is an eighth sheet, it is determined that a feed standby sheet is present (YES in step S608), and the process advances to step S609. In step S609, the CPU 201 determines whether the feed standby sheet that has not been added to group 3 is for double-sided printing. Since the eighth sheet is for double-sided printing (YES in step S609), the process advances to step S610.

In step S610, the CPU 201 determines whether the eighth sheet can be added to group 3. At this point, the seventh sheet is included in group 3. The group size of group 3 is A3 long-side, the seventh sheet is A3 long-side, and the eighth sheet is A4 short-side. Hence, since the addition of the eighth sheet to group 3 will exceed the size of group 3, the eighth sheet cannot be added to group 3. Therefore, NO is determined in step S610, and the process advances to step S614. In step S614, the CPU 201 feeds all of the sheets in group 3 to the sheet reversing unit 109 set as the conveyance destination. That is, the CPU 201 feeds the seventh sheet from the feeding tray so as to execute the front surface printing of double-sided printing on the seventh sheet. Subsequently, the main processing procedure ends.

The processing procedure at a timing 905 of FIG. 8 will be described next.

In step S601, the CPU 201 determines whether there is a feed standby sheet. In this case, since there is the eighth feed standby sheet (YES in step S601), the process advances to step S602. In step S602, the CPU 201 determines whether there is a refeed standby group. In this case, since groups 2 and 3 are present as the refeed standby groups for double-sided printing (YES in step S602), the process advances to step S603. In step S603, the CPU 201 checks the circulable group count. The CPU refers to the correspondence table of FIG. 7 as described above, and it is determined that the circulable group count is 3. The CPU 201 obtains the value, and the process advances to step S604.

In step S604, the CPU 201 determines whether the refeed standby group count is more than "(circulable group count−1)/2". Here, the value of "(circulable group count−1)/2" is 1, and the CPU 201 compares "1" with the refeed standby group count. In the timing 905, since there are groups 2 and 3, the refeed standby group count is 2. Hence, the refeed standby group count is more than 1 (YES in step S604), and the process advances to step S613.

In step S613, the CPU 201 refeeds all of the sheets in group 2, which is the leading group of the refeed standby groups, to the sorting unit 110 set as the conveyance destination. That is, the CPU 201 refeeds the sheets so as to execute the back surface printing of double-sided printing on the fourth, fifth, and sixth sheets. Subsequently, the main processing procedure ends.

As described above, even when there is a mixture of sheets of three different sizes in a job, and sheets of a plurality of sizes are included in a single group, the sheet conveyance speed can be kept constant and double-sided printing can be performed efficiently.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-102758, filed May 23, 2016, which is hereby incorporated by reference herein in its entirety.

What is claimed is:
1. A control apparatus comprising:
    a grouping unit configured to divide a plurality of sheets, each associated with a plurality of pages included in a processing target job into groups; and
    a control unit configured to control feeding of a sheet from a feeding unit onto a conveyance path and refeeding of a sheet that has been conveyed on the conveyance path onto the conveyance path,
    wherein the grouping unit sets a group size that is not less than a maximum sheet size used in the processing target job,
    wherein, in a case when deciding a group of a sheet corresponding to a predetermined page for which a group has not been decided in the processing target job,

(i) if a sum of lengths in a conveyance direction of sheets including the sheet corresponding to the predetermined page and one or more sheets, which have not been fed onto the conveyance path and have been determined to be a first group corresponding to one or more pages previous to the predetermined page is within the set group size, the grouping unit decides the group of the predetermined page as the first group, and (ii) if the sum of the lengths in the conveyance direction of sheets including the sheet corresponding to the predetermined page and the one or more sheets, which have not been fed onto the conveyance path and have been determined to be the first group, corresponding to the page previous to the predetermined page is not within the set group size, the grouping unit decides the group of the predetermined page as a second group different from the first group, and the control unit controls feeding and refeeding for each group grouped in the grouping unit.

2. The apparatus according to claim 1, wherein the control unit switches, in accordance with the number of groups conveyed on the conveyance path, feeding of the sheets from a feeding tray and refeeding of the sheets on which an image has been formed by an image forming unit.

3. The apparatus according to claim 1, wherein the group size is not less than the maximum sheet size of the processing target job and is a size that can include a plurality of predetermined sheet sizes included in the processing target job.

4. The apparatus according to claim 1, wherein the group size is a length of a maximum size sheet in a conveyance direction among sheets stored in the feeding unit.

5. The apparatus according to claim 1, wherein the group size is a length of the maximum sheet size in a conveyance direction among sheets used in the processing target job.

6. The apparatus according to claim 1, wherein the group includes a plurality of sheets of different sizes.

7. The apparatus according to claim 1, wherein the grouping unit divides sheets for double-sided printing into groups.

8. The apparatus according to claim 1, wherein a conveyance speed of the conveyance path is constant.

9. The apparatus according to claim 1, wherein the control unit performs refeeding if the number of groups that can be conveyed on the conveyance path will be exceeded if a new group is fed.

10. The apparatus according to claim 1, further comprising:
a conveyance unit configured to convey a sheet on the conveyance path; and
an image forming unit configured to form an image on the sheet on the conveyance path based on the image data.

11. The apparatus according to claim 1,
wherein the control unit refeeds the first group on which images have been formed, if the number of groups that can be conveyed on the conveyance path will be exceeded if a new group is fed, and
wherein the control unit does not refeed the first group on which images have been formed, if the number of groups that can be conveyed on the conveyance path will not be exceeded if the new group is fed.

12. A control method comprising:
grouping to divide a plurality of sheets each associated with a plurality of pages included in a processing target job into groups; and
controlling feeding of a sheet from a feeding unit onto a conveyance path and refeeding of a sheet which has been conveyed on the conveyance path onto the conveyance path,
wherein a group size that is not less than a maximum sheet size used in the processing target job is set in the grouping,
wherein, in a case when deciding a group of a sheet corresponding to a predetermined page for which a group has not been decided in the processing target job, in the grouping,
(i) if a sum of lengths in a conveyance direction of sheets including the sheet corresponding to the predetermined page and one or more sheets, which have not been fed onto the conveyance path and have been determined as a first group, corresponding to a page previous to the predetermined page is within the set group size, the group of the predetermined page is decided as the first group, and
(ii) if the sum of the lengths in the conveyance direction of sheets including the sheet corresponding to the predetermined page and the one or more sheets, which have not been fed onto the conveyance path and have been determined as the first group, corresponding to the page previous to the predetermined page is not within the set group size, the group of the predetermined page is decided as a second group different from the first group, and
the controlling controls feeding and refeeding for each group grouped in the grouping unit.

13. A non-transitory computer-readable storage medium storing a program for causing a computer to function as:
a grouping unit configured to divide a plurality of sheets each associated with plurality of pages included in a processing target job into groups; and
a control unit configured to control feeding of a sheet from a feeding unit onto a conveyance path and refeeding of a sheet that has been conveyed on the conveyance path onto the conveyance path,
wherein the grouping unit sets a group size that is not less than a maximum sheet size used in the processing target job,
wherein, in a case when deciding a group of sheets corresponding to a predetermined page for which a group has not been decided in the processing target job,
(i) if a sum of lengths in a conveyance direction of sheets including the sheet corresponding to the predetermined page and one or more sheets, which have not been fed onto the conveyance path and have been determined as a first group, corresponding to a page previous to the predetermined page is within the set group size, the grouping unit decides the group of the predetermined page as the first group, and
(ii) if the sum of the lengths in the conveyance direction of sheets including the sheet corresponding to the predetermined page and the one or more sheets, which have not been fed onto the conveyance path and have been determined as the first group, corresponding to the page previous to the predetermined page is not within the set group size, the grouping unit decides the group of the predetermined page as a second group different from the first group, and
the control unit controls feeding and refeeding for each group grouped in the grouping unit.

* * * * *